US006813398B1

(12) United States Patent
Taylor et al.

(10) Patent No.: US 6,813,398 B1
(45) Date of Patent: Nov. 2, 2004

(54) TUNABLE ELECTROOPTIC ADD-DROP FILTER APPARATUS AND METHOD

(75) Inventors: Henry F. Taylor, College Station, TX (US); Ohannes Eknoyan, College Station, TX (US)

(73) Assignee: Texas A & M University System, College Station, TX (US)

( * ) Notice: Subject to any disclaimer, the term of this patent is extended or adjusted under 35 U.S.C. 154(b) by 274 days.

(21) Appl. No.: 10/052,031

(22) Filed: Jan. 17, 2002

Related U.S. Application Data

(60) Provisional application No. 60/262,356, filed on Jan. 17, 2001.

(51) Int. Cl.[7] ................................................ G02B 6/27
(52) U.S. Cl. ......................................................... 385/11
(58) Field of Search ........................... 385/7–8, 11, 16, 385/31, 40, 129, 39

(56) References Cited

U.S. PATENT DOCUMENTS 5,748,810 A * 5/1998 Schmid .......................... 385/7

OTHER PUBLICATIONS

Z. Tang, O. Eknoyan, and H. F. Taylor, "Polarisation–Independent Electro–Optically Tunable Wavelength Filter in LiTaO3," Electron. Lett. 30, 1758–1759 (1994).*

* cited by examiner

Primary Examiner—Frank G. Font
Assistant Examiner—Michael P. Mooney
(74) Attorney, Agent, or Firm—J. Nevin Shaffer, Jr.

(57) ABSTRACT

In filters fabricated on a birefringent electrooptic substrate (28), a tunable electrooptic add-drop filter apparatus (10) includes two input single mode waveguides (44) and a first beam splitter (24) connected to the waveguides (44). A polarization converter (42) is connected to the waveguides (44) after the first beam splitter (24) wherein each polarization converter (42) includes more than one set of spaced apart, spatially periodic, strain-inducing pads (18). Electrode (s) (30) are provided in proximity to the polarization converter (42). A second beam splitter (24) is provided connected to the waveguides (44) after the polarization converter (42). Finally, two output single mode waveguides (48) are connected to the second beam splitter (24).

19 Claims, 8 Drawing Sheets

TUNABLE ELECTROOPTIC ADD-DROP FILTER APPARATUS AND METHOD

RELATED APPLICATIONS

The applicants claim the benefit of the provisional patent application filed on Jan. 17, 2001, application Ser. No. 60/262,356.

FIELD OF THE INVENTION

This invention relates to a tunable electrooptic add-drop filter apparatus and method. In particular, the invention relates to a tunable electrooptic add-drop filter apparatus and method in filters fabricated on a birefringent electrooptic substrate whereby a narrow range of optical frequencies are added to an optical fiber and a narrow range of optical frequencies are dropped from a fiber while leaving other frequencies unaffected.

BACKGROUND OF THE INVENTION

Wavelength division multiplexing is widely used in fiber optic communication to increase the data capacity of an optical fiber. Currently, 16, 32, or more data channels are transmitted in parallel on a single mode fiber using different optical carrier frequencies for each channel. To combine and separate these channels, a variety of frequency-selective components have been developed, including multilayer dielectric coatings, fiber Bragg gratings, arrayed waveguide gratings, and Mach-Zehnder chains. None of these techniques satisfies industry requirements for high-speed tunability and wide frequency tuning range.

An example of a prior-art electrooptic tunable filter (EOTF) for performing the add-drop function is illustrated in FIG. 1. Such a filter has been demonstrated previously by applicants at Texas A&M University in the substrate material lithium tantalate ($LiTaO_3$) [1].

The substrate for the prior art tunable filter (FIG. 1) is a single-crystal of a birefringent electrooptic material such as lithium niobate ($LiNbO_3$) or lithium tantalate ($LiTaO_3$). The waveguides are single mode for both TE and TM polarizations. Between the two directional coupler polarizing beam splitters (PBS's) is a spatially periodic dielectric film to produce polarization conversion, and electrodes for applying a tuning voltage.

Wavelength selectivity is determined by the phase-matching condition which governs coupling between the polarization states induced by the periodic film, as described by $$\Delta = \frac{2\pi v(n_1 - n_3)}{c} \pm \frac{2\pi}{\Lambda}, \quad (1)$$

where $\Delta$ is the phase mismatch constant, $v$ is the optical frequency, $n_1$ and $n_3$ are the principal refractive indices of the birefringent substrate material, and $\Lambda$ is the spatial period of the film. The frequency $v_j$ for which maximum polarization conversion occurs corresponds to the phase-matching condition $\Delta=0$. For frequencies far from $v_j$, $\Delta$ is large and very little polarization conversion will take place.

Tuning is accomplished in this prior art device by applying a voltage to electrodes on the surface of the substrate. The resulting electric field in the waveguide region causes a change in the birefringence ($n_1 - n_3$) via the linear electrooptic effect (Pockels effect). It follows from eq. 1 that a change in the birefringence causes a change in the frequency for which phase-matched polarization coupling occurs.

Waveguides can be fabricated by a process which involves (1) deposition of a thin (90 nm) layer of titanium on the surface of the substrate, (2) patterning the titanium by a process of photolithography and etching, and (3) diffusing the titanium into the substrate at 1050° C. To produce the electrode pattern, a uniform aluminum film is deposited on the substrate, patterned photolithographically, and etched. Finally, in the case of the tunable filter, a silicon dioxide film is deposited at 350° C., masked with photoresist at room temperature, and etched to produce a periodic bar pattern in the film. Strain resulting from the mismatch in thermal expansion coefficients between film and substrate causes polarization conversion in the waveguides.

Another prior art design which is the subject of the co-pending patent application Ser. No. 09/737,206 is illustrated in FIG. 2. This design is promotes ease of manufacturing for the EOTF by eliminating the need for PBS's, which are difficult to produce with the required tolerances. The design of FIG. 2 differs from that of FIG. 1 at least in that the strain-inducing strips are offset by $\Lambda/2$ in the top waveguide relative to the bottom one, and the optical path difference in the top waveguide differs from that in the bottom one by $\lambda/2$.

An expanded view of a section of waveguide containing the strain pads and electrodes for electrooptic tuning is shown in FIG. 3. The diagram in FIG. 3 could represent either the upper or lower waveguide in the EOTH of either FIG. 1 or FIG. 2. The performance of the tunable prior art filters of FIG. 1 or FIG. 2 is determined by the dependence of polarization conversion on optical frequency in this waveguide section.

From eq. (1) it is determined that the spatial period $\Lambda$ of the strain pads in the EOTF is determined by the center frequency $v^*$ of the spectral region in which the filter is intended to operate and the refractive indices $n_1$ and $n_3$ of the birefringent substrate. The optical wavelength region of most interest for optical fiber communication is 1530–1560 nm. The frequency of the center of this wavelength regime is $c/\lambda^*$, with c the free-space speed of light and $\lambda^*=1545$ nm, is $v^*=2.998\times10^8/1545\times10^{-9}=1.929\times10^{14}$ Hz. For a lithium niobate substrate, with $n_1=2.2118$ and $n_3=2.1384$, it is calculated from eq. (1) that $\Lambda=21.05$ $\mu$m.

A theoretical plot of the efficiency for polarization conversion X on optical frequency, measured relative to the frequency for maximum polarization conversion, is given in FIG. 4. The plot assumes that the substrate material is lithium niobate ($LiNbO_3$), a total length for the polarization conversion region of 3.6 cm, and a uniform coupling constant induced by the strain pads of 0.139 $cm^{-1}$. The same conditions apply to the plot of FIG. 5, in which the frequency scale is expanded.

The length of the polarization conversion region was chosen to give the first nulls in the conversion spectrum at ±100 GHz relative to the central peak where the conversion efficiency is a maximum. This would correspond to application in a wavelength-division-multiplexed (WDM) communication system in which the channel spacing corresponds to the International Telecommunication Union (ITU) specification of 100 GHz channel spacing. Thus, when a particular channel is selected, the adjacent channel would correspond to a null, to reduce crosstalk between channels.

The present invention addresses several deficiencies with the prior-art EOTF designs described by the diagrams in FIGS. 1–3 and the calculated response curves of FIGS. 4 and 5. Among these deficiencies are:

(1) The required tuning voltage is too high. To tune the center frequency of one of these prior art filters by 100 GHz is estimated to require about 7 V with an electrode spacing of 10 µm. Thus, tuning over 32 channels would require a voltage swing of 32×7=224 V, and to tune over 64 channels. requires a voltage swing of 448 V. Such large voltages applied over such a short distance causes degradation or even destruction of the EOTF.

(2) The nulls in the conversion spectra of FIGS. 4 and 5 are not equally spaced at the desired 100 GHz separation. This adversely affects the need to minimize crosstalk in a WDM system.

(3) The time delay experienced by the light in traversing the EOTF is different for the TE and TM polarizations due to the birefringence of the substrate. For example, for a substrate length $L_{sub}$ of 7 cm, with $n_1-n_3=0.0734$, the delay difference is $L_{sub}(n_1-n_3)/c$, with c the free-space speed of light, which is calculated to be $7\times0.0734/2.998\times10^{10}=17$ ps. Such a delay leads to degradation of the "eye diagram" in a high-data-rate system, particularly at data rates of 10 Gb/s or higher.

(4) The length of the polarization conversion region required to achieve a 50 GHz channel spacing for WDM is not compatible with the size of available electrooptic substrates. The length of the conversion region is inversely proportional to the channel spacing, so that for a 50 GHz spacing the conversion region needs to be 3.6×2=7.2 cm long. When the length required for beam splitters and separating waveguide regions are taken into account, a 50 GHz device could not be accommodated on the largest commercial lithium niobate substrates, which are 3" (7.5 cm) in diameter.

SUMMARY OF THE INVENTION

Accordingly, the tunable electrooptic add-drop filter apparatus and method of the present invention includes, in filters fabricated on a birefringent electrooptic substrate, two input single mode waveguides. A first beam splitter is connected to the waveguides and a polarization converter is connected to each of the waveguides after the first beam splitters wherein each polarization converter includes more than one set of spaced apart, spatially periodic, strain-inducing pads. Electrodes are located in proximity to each of the polarization converters. A second beam splitter is connected to the waveguides after the polarization converter and two output single mode waveguides are connected to the second beam splitters.

In another aspect of the invention, the length of the polarization converter is given by the formula: $L_{tot}=N_cL1+(N_c-1)L2$ where: Nc=an integral number of polarization coupling regions of length L1 and L2=longer regions between the polarization coupling regions in which polarization coupling does not occur. In a further aspect, a multiplicity of individual strain-inducing pads are provided wherein the spacing between any two such strain-inducing pads is equal to an integer times a particular minimum spacing between adjacent strain-inducing pads. In another aspect of the invention, the widths of the strain-inducing pads are varied. In a further aspect of the invention, the polarization converter has a center and edges and the width of the strain-inducing pads is greater at the center of the polarization converter and tapers monotonically towards the edges.

In another aspect of the invention, polarization maintaining fibers are connected to each input and output single mode waveguide of the tunable electrooptic add-drop filter apparatus so as to compensate for the difference in time delay for the two polarizations of light propagating in and through the single mode optical waveguides in the birefringent electrooptic substrate. In a further aspect of the invention, multiple tunable electrooptic add-drop filters of the present invention are connected in series. In another aspect of the invention, the multiple electrooptic add-drop filters have different values of Nc where Nc is an integral number of polarization coupling regions.

In another embodiment of the invention, in filters fabricated on a birefringent electrooptic substrate, a tunable electrooptic add-drop filter apparatus includes two input/output single mode waveguides. A beam splitter is connected to the waveguides. A polarization converter is connected to each of the waveguides wherein the polarization converter includes more than one set of spaced apart, spatially periodic, strain-inducing pads. Electrodes are provided on the substrate in proximity to the polarization converter. Finally, a reflector is connected to the waveguides after the polarization converter.

In a further aspect of the invention, the length of the polarization converter is given by:. $L_{tot}=N_cL1+(N_c-1)L2$ where: Nc=an integral number of polarization coupling regions of length L1 and L2=longer regions between the polarization coupling regions in which polarization coupling does not occur. In a further aspect of the invention, a multiplicity of individual strain-inducing pads are provided wherein the spacing between any two such strain-inducing pads is equal to an integer times a particular minimum spacing between adjacent strain-inducing pads. In a further aspect of the invention, widths of the strain-inducing pads are varied.

In yet another aspect of the invention, the polarization converter has a center and edges and the width of the strain-inducing pads is greater at the center of the polarization converter and tapers monotonically toward the edges. In another aspect, a voltage tuner is connected to the electrode. In another aspect of the invention, polarization maintaining fibers are connected to each input/output single mode waveguide. In another aspect, an optical circulator is connected to each input/waveguide.

In another embodiment of the invention, in filters fabricated on a birefringent electrooptic substrate, a tunable electrooptic add-drop filter method is provided beginning with the step of providing two input single mode waveguides on the substrate. A first beam splitter is connected to the waveguides. A polarization converter is connected to the waveguides after the first beam splitter wherein the polarization converter is conformed to include more than one set of spaced apart, spatially periodic, strain-inducing pads. An electrode is connected to the polarization converter and a second beam splitter is connected to the waveguides after the polarization converter. Next, two output single mode waveguides are connected to the second beam splitter. Finally, a voltage tuner is connected to the electrode and voltage is applied to the electrode through the voltage tuner.

In a further aspect of the invention the step of forming the length of the polarization converter is provided in accordance with the formula: $L_{tot}=N_cL1+(N_c-1)L2$ where: Nc=an integral number of polarization coupling regions of length L1 and L2=longer regions between the polarization coupling regions in which polarization coupling does not occur.

DESCRIPTION OF THE DRAWINGS

Other objects, features, and advantages of the present invention will become more fully apparent from the following detailed description of the preferred embodiment, the appended claims and the accompanying drawings in which:

DETAILED DESCRIPTION OF THE INVENTION

Figure 6:
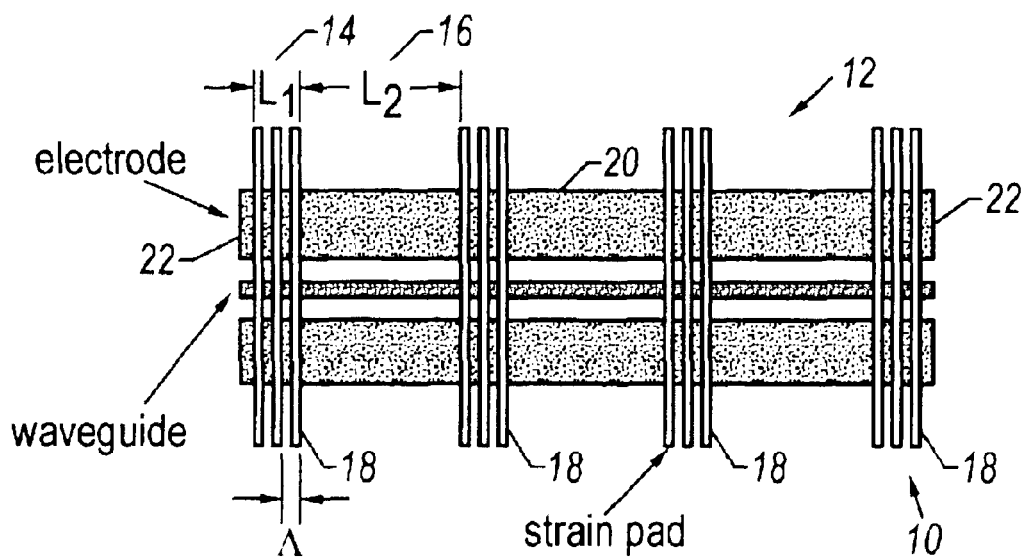
FIG. 6 is a schematic illustrating the tunable electrooptic add-drop filter of the present invention.

The preferred embodiment of the present invention is illustrated by way of example in FIGS. 6–17. To begin with, the tunable electrooptic add-drop filter 10 of the present invention includes a polarization conversion/electrooptic tuning section 12 which includes an integral number $N_c$ of relatively short polarization coupling regions 14 of length $L_1$. Polarization coupling regions 14 are separated by considerably longer, non-polarization regions, regions 16 of length $L_2$ where no polarization coupling occurs, as illustrated in FIG. 6. Total length $L_{tot}$ of the polarization conversion/electrooptic tuning region 12 is given by $$L_{tot}=N_cL_1+(N_c-1)L_2 \qquad (2)$$

It is important to note that spatial coherence of the more than one set of spaced apart, spatially periodic, strain-inducing pads 18 must be maintained over the entire length of the polarization conversion/electrooptic tuning region 12. Thus, the center-to-center spacing between any two of the pads 18 is exactly an integer times Λ, even if the two pads 18 are from different groups.

Figure 15:
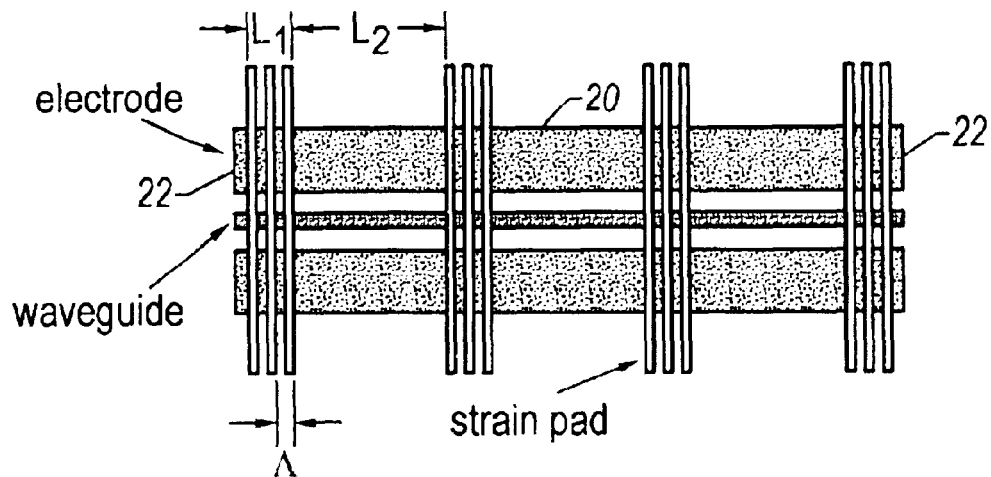
FIG. 15 is a schematic of the present invention illustrating apodization of polarization coupling strength by varying the width of the strain-inducing pads such that the polarization coupling is strongest at the center of the polarization conversion region where the pads are wider and weaker at the edges were the pads are narrower.

Another important feature of the filter 10 of the present invention is to apodize the strength of coupling induced by the strain pads 18 i.e., to make the coupling strength a function of position over the length of the polarization conversion/electrooptic tuning region 12. This can be accomplished by varying the width of the pads 18 (as illustrated in FIG. 15)—narrower pads will produce weaker polarization coupling. Calculations show that apodization in which the coupling is strongest at the center 20 of the polarization conversion/electrooptic tuning section 12 and tapers monotonically toward the edges 22 provides the spectral characteristics needed for equally spaced channels in a WDM system.

Figure 7:
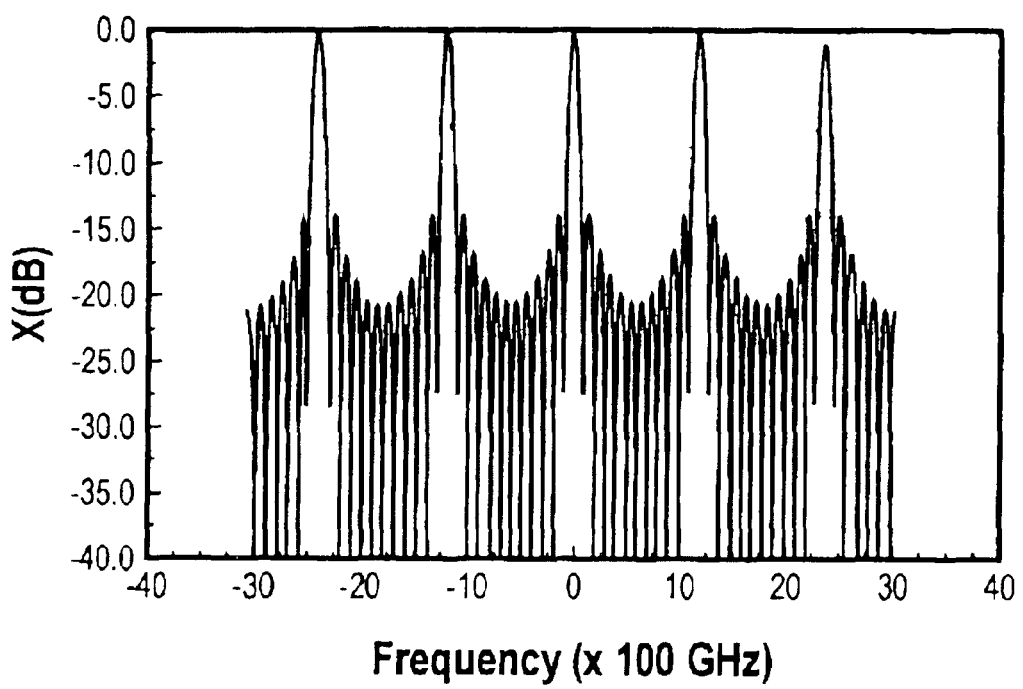
FIG. 7 is a schematic illustrating the predicted polarization conversion efficiency vs. optical frequency for the waveguide section in accordance with the invention of FIG. 6, plotted using the following parameters: Nc=12. L1=0.03 cm, L2=0.31 cm, k=1.39 cm-1, ko=0.35 cm-1.
Figure 8:
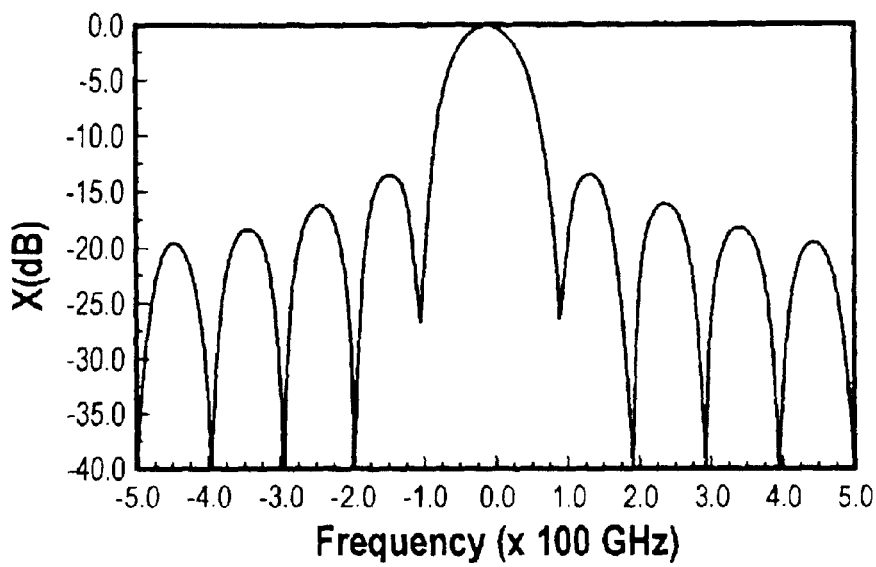
FIG. 8 is a plot of FIG. 7 with expanded frequency axis.

Predicted spectral response for the case of a lithium niobate substrate with $N_c$=12, $L_1$=0.03 cm, and $L_2$=0.31 cm is plotted in FIGS. 7 and 8. The coupling constant values were apodized according to the formula $$\kappa=\kappa_0+\kappa_1 COS[2\pi(z-L_{tot}/2)], \qquad (3)$$

with $\kappa_0$=1.39 cm$^{-1}$ and $\kappa_1$=0.35 cm$^{-1}$, and z the position relative to the start of the polarization coupling region. In this case $L_{tot}$ is calculated from eq. (2) to be 3.77 cm.

FIG. 7. illustrates the predicted polarization conversion efficiency vs. optical frequency for waveguide section of FIG. 6 with apodized coupling, plotted using the following parameters: $N_c$=12, $L_1$=0.03 cm, $L_2$=0.31 cm, $\kappa$=1.39 cm$^{-1}$, $\kappa_0$=0.35 cm$^{-1}$.

Figure 1:
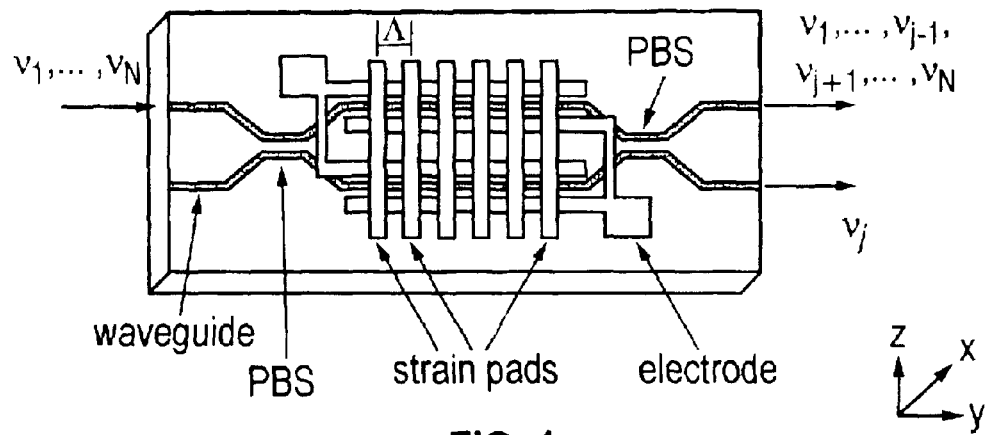
FIG. 1 is a schematic of a PRIOR ART EOTF design.
Figure 2:
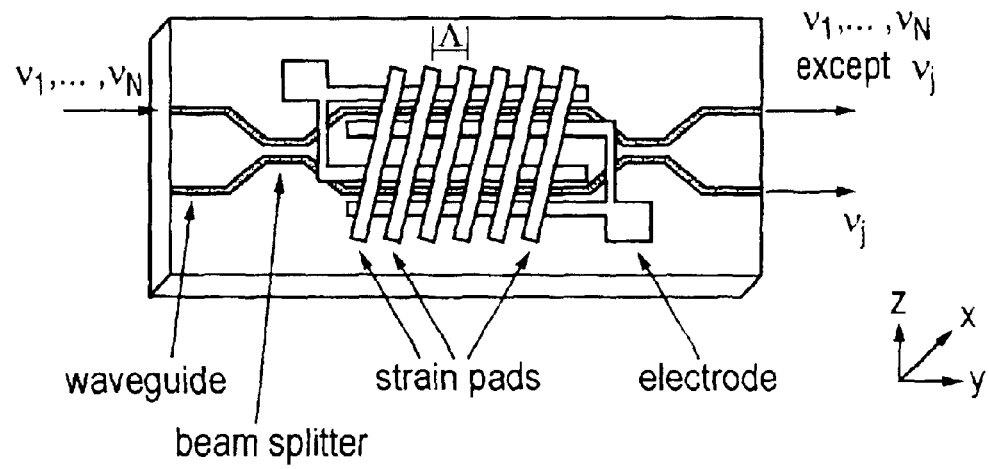
FIG. 2 is a schematic of a PRIOR ART EOTF designed with relaxed beam splitter requirements.
Figure 3:
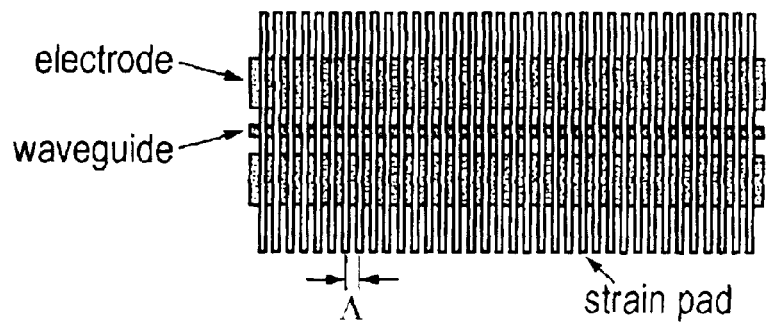
FIG. 3 is a schematic expanded view of the polarization conversion/electrooptic region of a PRIOR ART EOTF.
Figure 4:
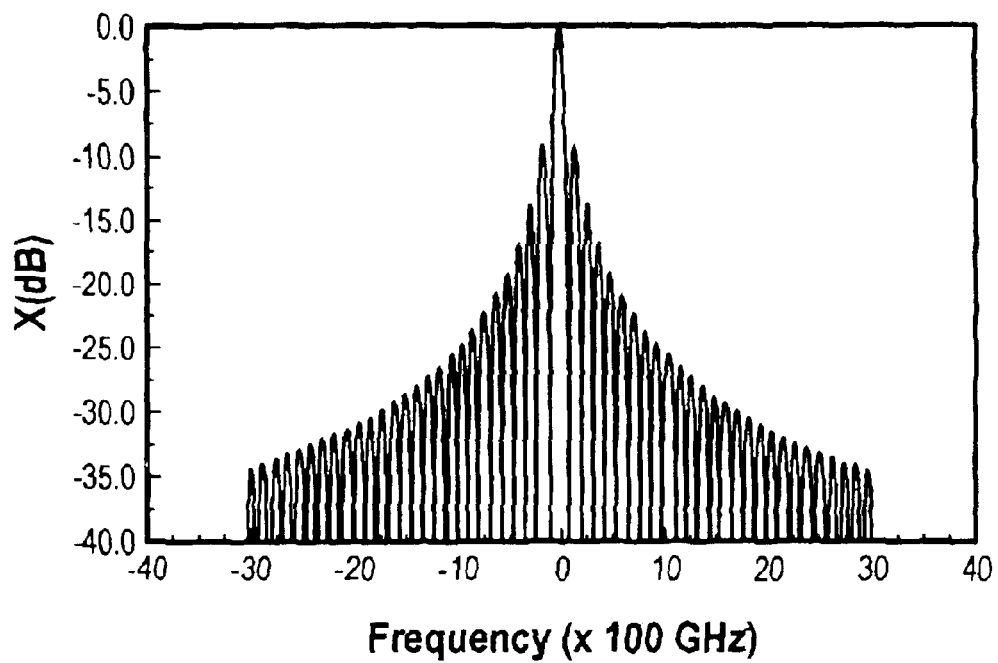
FIG. 4 is a schematic illustrating the predicted polarization conversion efficiency vs. optical frequency for the waveguide section illustrated in FIG. 3.
Figure 5:
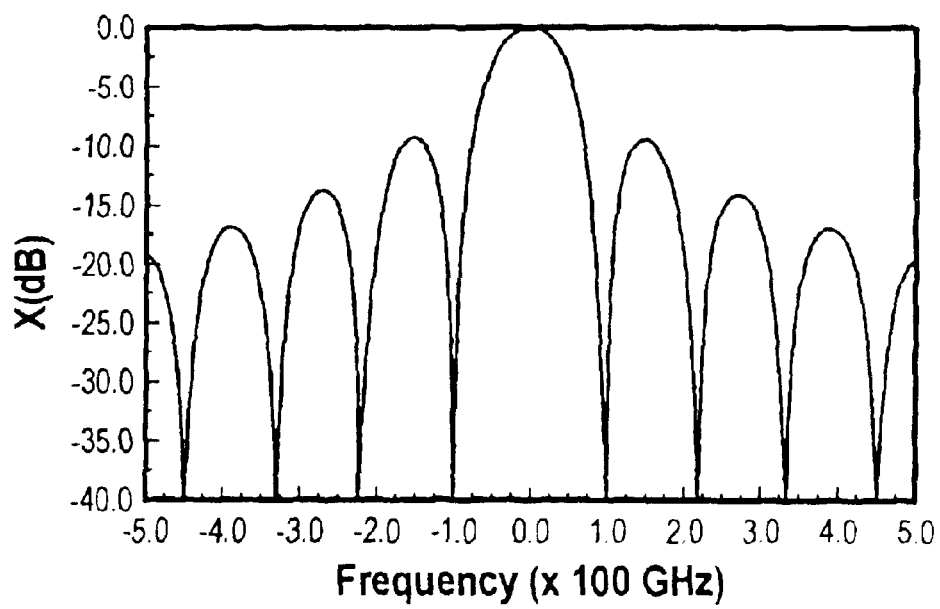
FIG. 5 is a schematic illustrating the plot of FIG. 4 with the frequency scale expanded.

The spectral characteristic of FIG. 7, which corresponds to alternating coupling 14/non-coupling 16 regions as in FIG. 6, is almost a periodic function of frequency. This contrasts with the Prior Art spectrum of FIG. 4, which corresponds to uniform coupling as in Prior Art FIG. 3, in which there is only one main peak. A second difference is that the nulls are almost equally (spaced at 100 GHz intervals in the plot of the present invention 10 shown in FIG. 7, whereas the by spacing between nulls varies considerably in the plot of Prior Art FIG. 4. This is best seen by comparing the plots in FIGS. 5 (Prior Art) and 8 (present invention), which have expanded horizontal (frequency) axes.

For the filter 10 design of the present invention as illustrated in FIG. 6, the spacing between adjacent principal peaks corresponds to the frequency change Δν which produces a 2π radian value for the phase change Δϕ between the TE and TM polarization components for light propagating over one spatial period of length $L_1+L_2$. Since $$\Delta\phi=2\pi(n_1-n_3)\Delta\nu(L_1+L_2)/c, \qquad (4)$$

it follows that $$\Delta\nu=c/[(n_1-n_3)(L_1+L_2)]. \qquad (5)$$

In the plots of FIGS. 7 and 8, the spacing between principal peaks is Δν=1200 GHZ, or $N_c$ times the spacing between one of the peaks and an adjacent null.

Figure 9:
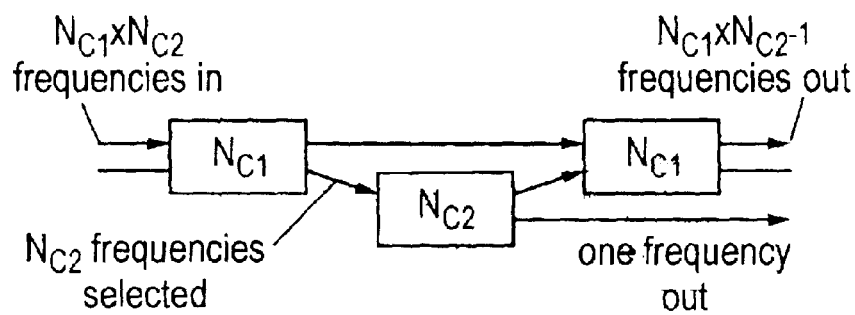
FIG. 9 illustrates an arrangement of three EOTFs of the present invention in series so as to select one of Nc1×Nc2 equally spaced frequency channels.

By way of a further advantage of the present invention, by configuring filters 10 with different values of $N_c$ in series, it is possible to greatly increase the number of channels which can be accessed using moderate tuning voltages. One configuration for accomplishing this with three EOTF's in series is illustrated in FIG. 9. The first filter 10 selects $N_{c2}$ frequency channels spaced $N_{c1}$ channels apart. The second EOTF filter 10 with a spacing between principal peaks of $N_{c2}$ channels selects one of the $N_{c2}$ frequency channels as the output (drop) frequency. The third EOTF filter 10 with a spacing between principal peaks of $N_{c1}$ channels combines $N_{c2}-1$ of the $N_{c2}$ frequencies selected by the first EOTF with all of the frequencies not selected by the first EOTF.

Figure 10:
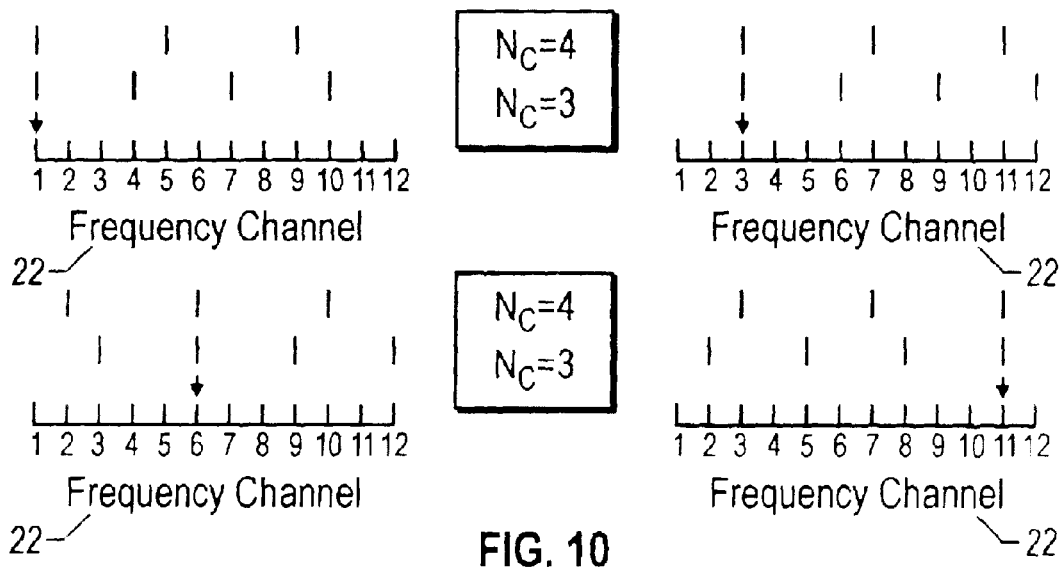
FIG. 10 is a schematic illustrating frequency selection by EOTF's of the present invention in series, with Nc1=4 and Nc2=3.

FIG. 10. is an illustration of frequency selection by EOTF's in series, with $N_{c1}=4$ and $N_{c2}=3$. The frequency channels 22 selected by each filter 10 are indicated by vertical lines on the diagrams. A frequency channel 22 is removed when two of the vertical lines correspond to the same frequency channel. A tuning voltage applied to each filter 10 causes a translation in frequency of its polarization-converted spectrum, but does not affect the frequency spacing between principal peaks. By independently varying the two tuning voltages, any of the 12 frequencies can be selected, as indicated by an arrow in the diagram.

The number of independently accessible frequency channels 22 is $N_{c1} \times N_{c2}$, provided that 1 is the only common factor of these two integers. Tuning of the spectral characteristics of filters 10 with $N_{c1}=4$ and $N_{c2}=3$ in series to select particular frequency channels is illustrated in FIG. 10.

The use of two filters 10 in series greatly increases the number of frequency channels which can be accessed, subject to a constraint on the maximum voltage which can be applied to an EOTF. The voltage required to tune over the entire frequency range of one of the EOTF's is that needed to produce $\pm\pi$ radian change in $\Delta\phi$, the phase difference between the TE and TM polarization components for light propagating over one spatial period of length $L_1+L_2$. This voltage-induced phase change is $$\Delta\phi = 2\pi v^*(L_1+L_2)\Delta(n_1-n_3)/c, \quad (4)$$

with $v^*$ the center frequency in the optical spectrum and $\Delta(n_1-n_3)$ the voltage-induced birefringence change. Using parameters appropriate to lithium niobate at a wavelength of 1545 nm, with $L_1+L_2=0.34$ cm, it is estimated that a voltage change of $\pm 42$ V will be required to access 12 wavelengths in a single-stage EOTF with $N_c=12$. Using the configuration of FIG. 9 with $N_{c1}=12$ and $N_{c2}=11$, it is possible to access 132 WDM channels without increasing the required voltage. To access this many channels with a single Prior Art EOTF would require a voltage swing about 11 times larger, or $\pm 462$ V. Such large voltages would undoubtedly degrade or destroy the device.

Figure 11:
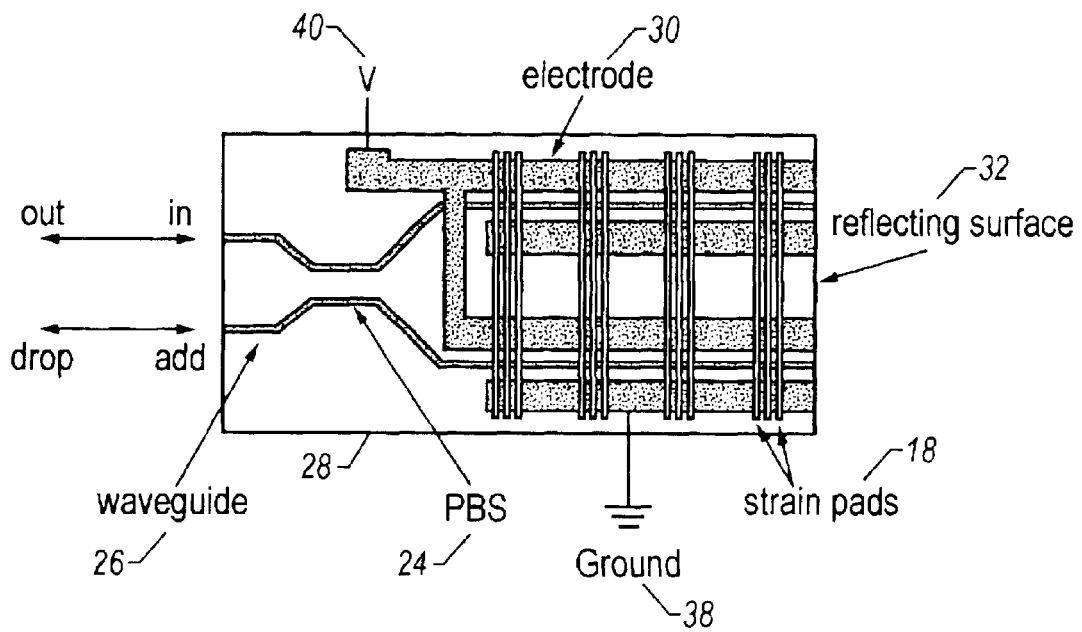
FIG. 11 is a schematic illustrating reflective configuration for the EOTF of the present invention.
Figure 12:
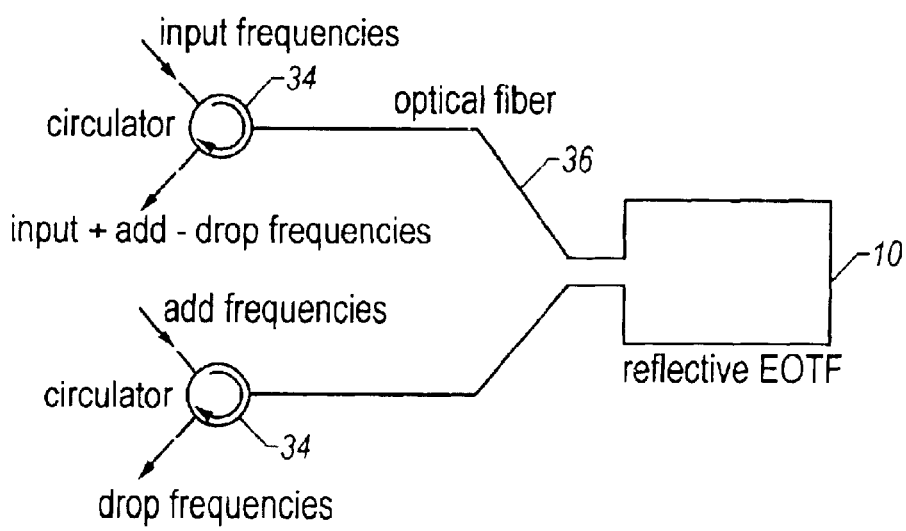
FIG. 12 is a schematic illustrating a four-port add-drop filter utilizing the reflective EOTF of the present invention as illustrated in FIG. 11.

A reflective arrangement for achieving closer WDM channel spacings for a substrate of a given length is shown in FIG. 11. The benefit of this arrangement is that the effective length for polarization conversion and electrooptic tuning is twice the physical length, and only one beam splitter 24 is needed. This makes it possible to construct an EOTF with 50 GHz channel spacing on a 3" wafer. The reflective embodiment of the present invention includes a single waveguide 26 in substrate 28, and an electrode 30. In addition to the strain-inducing pads 18 this embodiment includes a reflector 32. As a result, this embodiment of filter 10 has only two physical ports, but it can be operated as a four-port device as required for most WDM applications through the use of two optical circulators 34 connected by optical fiber 36, as shown in FIG. 12. Also shown in FIG. 11 is ground 38 and voltage tuner 40. Voltage tuner 40 is any voltage application device now known or hereafter developed for applying varying amounts of voltage.

FIG. 11. illustrates a reflective configuration for EOTF 10. The reflecting surface could be a multilayer dielectric film or a metal film deposited on the end of the substrate.

For the embodiment of the invention 10 of FIGS. 11 and 12, if the total length of the polarization conversion/electrooptic interaction region 12 is 3.77 cm, with twelve separate polarization conversion regions 12, then the filter 10 would have the spectral characteristics of a non-reflective device with a channel spacing of 50 GHz and a spacing between principal conversion peaks of 1200 GHz, or 24 channels.

As another important feature of the present invention, the applicants have determined that the difference in time delay for the two polarizations of light in the EOTF's can be compensated by using a polarization maintaining (PM) fiber 42 of sufficient length following each EOTF 10. The PM fiber 42 is oriented such that light polarized along the slow axis of the EOTF 10 is polarized along the fast axis of the PM fiber 42, and vice versa For example, if the fiber 42 has a 0.1% birefringence and a group refractive index of 1.46, the differential delay is $0.001 \times 1.46/2.998 \times 10^8$ seconds per meter length of fiber 42, or 4.9 ps per meter. Thus the 17 ps of differential delay between the polarization states in the example introduced earlier would be canceled by 3.5 m of PM fiber 42. This technique is applicable for a single EOTF, as in FIGS. 6, 13 and 16 for example, for EOTF's in a series arrangement, as in FIG. 9, or for the reflective configuration of FIGS. 11 and 12.

Figure 13:
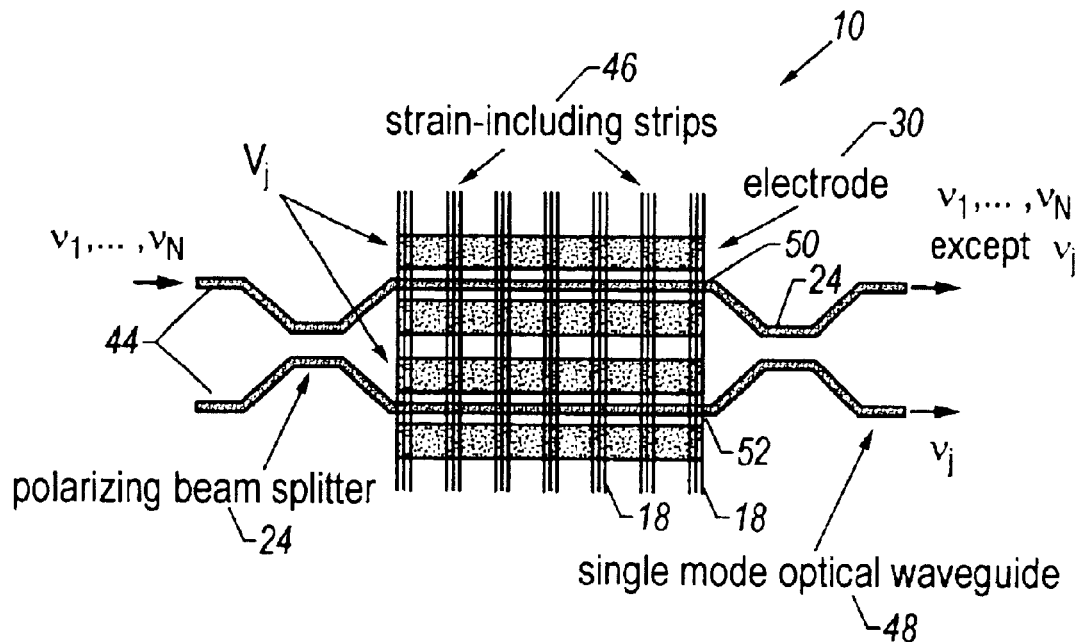
FIG. 13 is a another schematic illustrating the EOTF of the present invention as illustrated in FIG. 6, including an input and an output waveguide.
Figure 14:
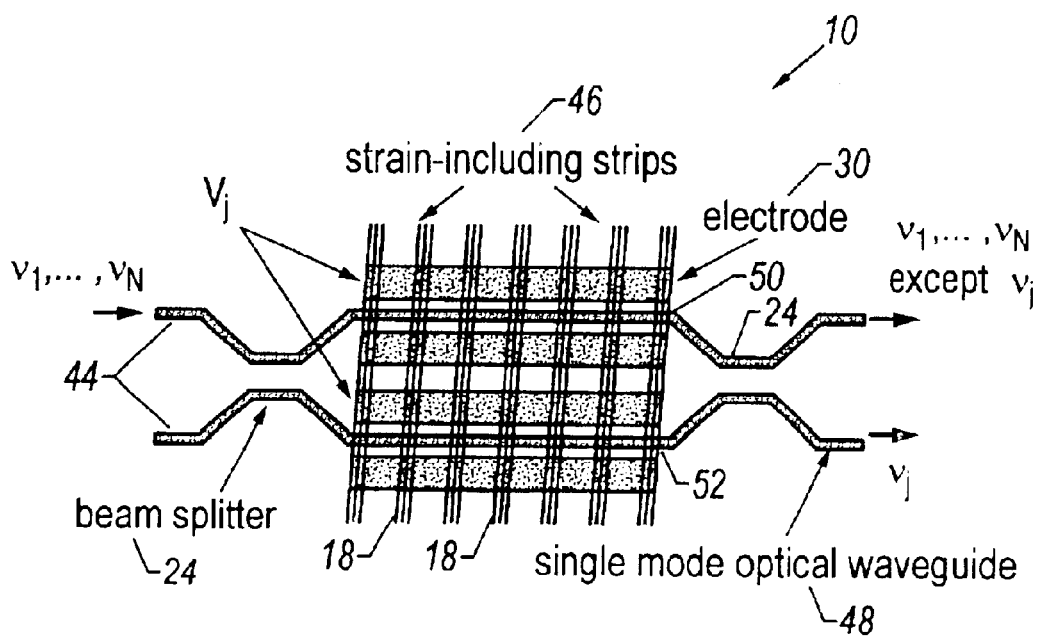
FIG. 14 is a another embodiment of the present invention with slanted strain pads.

Referring now to FIGS. 13 and 14, the full version of the filter 10 of the present invention is set forth as partially illustrated in FIGS. 6. The filter 10 includes two input single mode waveguides 44 followed by a first beam splitter 24. A polarization converter 46 is connected thereafter. The polarization converter 46 is composed of more than one set of spaced apart, spatially periodic, strain-inducing pads 18, as previously discussed. Electrodes 30 are located on substrate 28 connected in proximity to the polarization converter 46. Thereafter, a second beam splitter 24 is connected to output waveguides 48. FIG. 14 illustrates strain pads 18 slanted which eliminates the need for polarizing beam splitters.

FIG. 15 illustrates the embodiment of the invention whereby the polarization coupling strength is apodized by varying the width of the strain-inducing pads 18. As illustrated, the polarization coupling is strongest at the center 20 of the polarization conversion region 12 were the strain-inducing pads 18 are wider.

Figure 16:
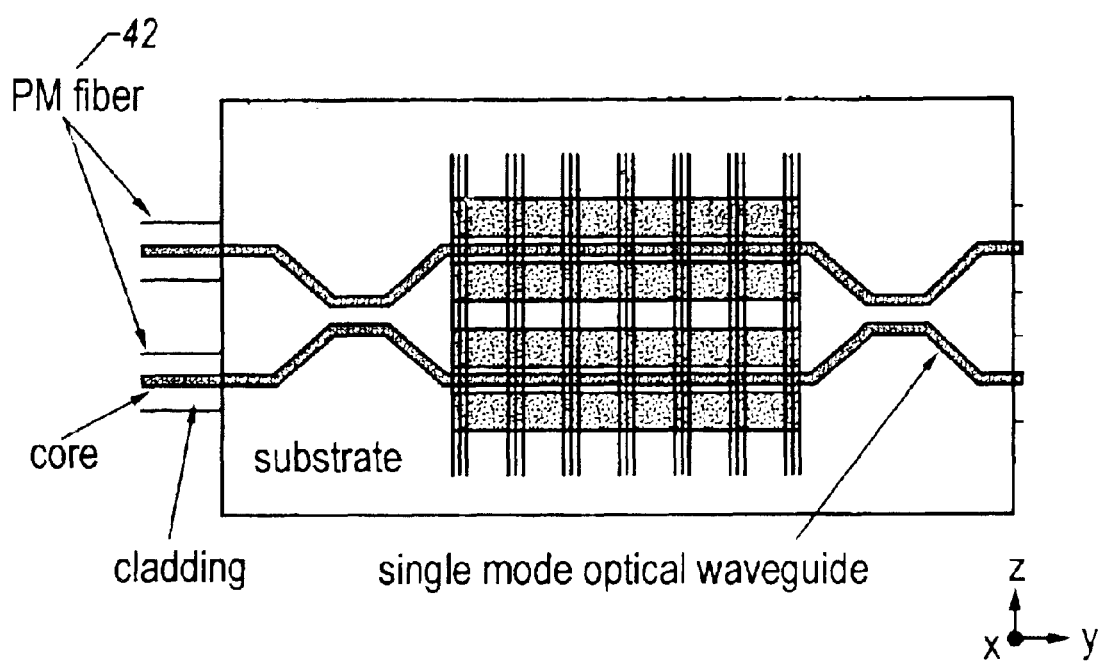
FIG. 16 is an illustration of the present invention utilizing polarization maintaining fibers to equalize the time delay for different polarizations of light.
Figure 17:
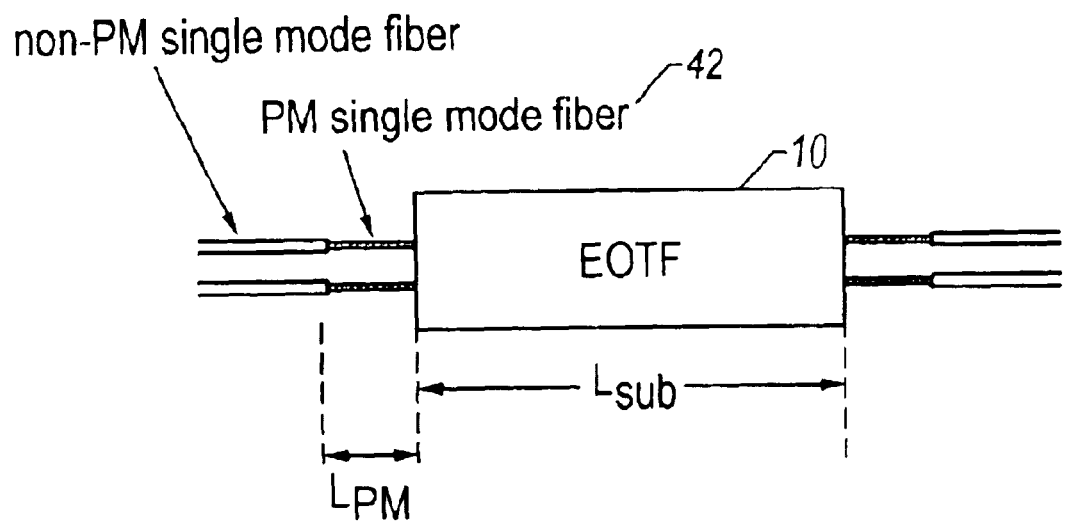
FIG. 17 is an illustration of the polarization maintaining fibers connected to conventional "non-polarization maintaining" single mode fibers.

FIGS. 16 and 17 illustrate the use of polarization maintaining fiber 42, as previously discussed above.

The tunable filter 10, fabricated on an electrooptic substrate material 28, consists of two input single mode waveguides 44 followed by a beam splitter 24. Light leaving the beam splitter 24 is divided between two parallel waveguide sections 50 and 52, each of which contains a polarization converter 46. Each of these polarization converters 46 features a set of spatially periodic, strain-inducing, thin-film dielectric strips/pads 18 which cross over the waveguide sections 50 and 52 for inducing coupling between orthogonally polarized modes of light, and electrode(s) 30 for applying an electric field across the waveguide. The waveguides 50 and 52 containing the polarization converter 46 converge in a second beam splitter 24, then separate to form the two output waveguides 48.

The add-drop filter 10 adds a narrow range of optical frequencies to an optical fiber 36 which may contain other optical frequencies, and drops (removes) a narrow range of optical frequencies from a fiber 36 while leaving other frequencies unaffected.

In summary, the invention described herein relates to a new tunable filter 10 which provides a combination of narrow interchannel frequency spacing (50 GHZ or 100 GHZ), low-voltage operation, and extremely wide frequency tuning range.

Add-drop filters are key components for wavelength-division-multiplexed fiber optic communication systems. No other technology offers the combination of tuning speed (<<1 µs) and tuning range (>>30 nm) of the filter 10 disclosed herein.

The description of the present embodiments of the invention have been presented for purposes of illustration, but are not intended to be exhaustive or to limit the invention to the form disclosed. Many modifications and variations will be apparent to those of ordinary skill in the art. As such, while the present invention has been disclosed in connection with the preferred embodiment thereof, it should be understood that there may be other embodiments which fall within the spirit and scope of the invention as defined by the following claims.

What is claimed is:

1. In filters fabricated on a birefringent electrooptic substrate, a tunable electrooptic add-drop filter apparatus, the apparatus comprising:
   (a) two input single mode waveguides;
   (b) a first beam splitter connected to said waveguides;
   (c) a polarization converter connected to each of said waveguides after said first beam splitter wherein each said polarization converter includes more than one set of spaced apart, spatially periodic, strain-inducing pads wherein the length of said polarization converter is given by:

$$L_{tot} = NcL1 + (Nc-1)L2$$

where:
   Nc=an integral number of polarization coupling regions of length L1 and
   L2=longer regions between said polarization coupling regions in which polarization coupling does not occur;
   (d) electrodes in proximity to each said polarization converter;
   (e) a second beam splitter connected to said waveguides after said polarization converter; and
   (f) two output single mode waveguides connected to said second beam splitter.

2. The apparatus of claim 1 further comprising a plurality of individual strain-inducing pads wherein the spacing between any two such strain-inducing pads is equal to an integer times a particular minimum spacing between adjacent strain-inducing pads.

3. The apparatus of claim 2 wherein widths of the strain-inducing pads are varied.

4. The apparatus of claim 3 wherein said polarization converter has a center and edges and wherein the width of said strain-inducing pads is greater at the center of said polarization converter and tapers monotonically towards said edges.

5. The apparatus of claim 1 further comprising polarization maintaining fibers connected to each input and output single mode waveguide.

6. The apparatus of claim 1 further comprising a plurality of said tunable electrooptic add-drop filters in series.

7. The apparatus of claim 6 wherein said plurality of tunable electrooptic add-drop filters have different values of Nc where Nc is an integral number of polarization coupling regions.

8. The apparatus of claim 1 further comprising a voltage tuner connected to said electrodes.

9. In filters fabricated on a birefringent electrooptic substrate, a tunable electrooptic add-drop filter apparatus, the apparatus comprising:
   (a) two input/output single mode waveguides;
   (b) a beam splitter connected to the waveguides;
   (c) a polarization converter connected to each of said waveguides wherein the polarization converter includes more than one set of spaced apart spatially periodic, strain-inducing pads;
   (d) electrodes on the substrate in proximity to each polarization converter; and
   (e) a reflector connected to the waveguides after the polarization converter.

10. The apparatus of claim 9 wherein the length of the polarization converter is given by:

$$L_{tot} = NcL1 + (Nc-1)L2$$

where:
    Nc=an integral number of polarization coupling regions of length L1 and
    L2=longer regions between said polarization coupling regions in which polarization coupling does not occur.

11. The apparatus of claim 10 further comprising a multiplicity of individual strain-inducing pads wherein the spacing between any two such strain-inducing pads is equal to an integer times a particular minimum spacing between adjacent strain-inducing pads.

12. The apparatus of claim 11 wherein widths of the strain-inducing pads are varied.

13. The apparatus of claim 12 wherein said polarization converter has a center and edges and wherein the width of said strain-inducing pads is greater at the center of said polarization converter and tapers monotonically towards said edges.

14. The apparatus of claim 9 further comprising a voltage tuner connected to the electrode.

15. The apparatus of claim 9 further comprising polarization maintaining fibers connected to each input/output single mode waveguide.

16. The apparatus of claim 9 further comprising an optical circulator connected to each said input/output waveguide.

17. In filters fabricated on a birefringent electrooptic substrate, a tunable electrooptic add-drop filter method, the method comprising the steps of:
    (a) providing two input single mode waveguides on said substrate;
    (b) connecting a first beam splitter to said waveguides;
    (c) connecting a polarization converter to said waveguides after said first beam splitter wherein said polarization converter is conformed to include more than one set of spaced apart, spatially periodic, strain-inducing pads wherein the length of said polarization converter is given by:

$$L_{tot} = NcL1 + (Nc-1)L2$$

where:
    Nc=an integral number of polarization coupling regions of length L1 and
    L2=longer regions between said polarization coupling regions in which polarization coupling does not occur;
    (d) connecting electrodes to said polarization converter;
    (e) connecting a second beam splitter to said waveguides after said polarization converter;
    (f) connecting two output single mode waveguides to said second beam splitter;
    (g) connecting to voltage tuner to said electrodes; and (h) applying a voltage to said electrodes through said voltage tuner.

18. The method of claim 17 further comprising the step of connecting a plurality of said tunable electrooptic add-drop filters in series.

19. The method of claim 17 further comprising the step of replacing step e with the step of adding a reflector to said waveguides after said polarization converter.

* * * * *